United States Patent Office 3,201,103
Patented Aug. 17, 1965

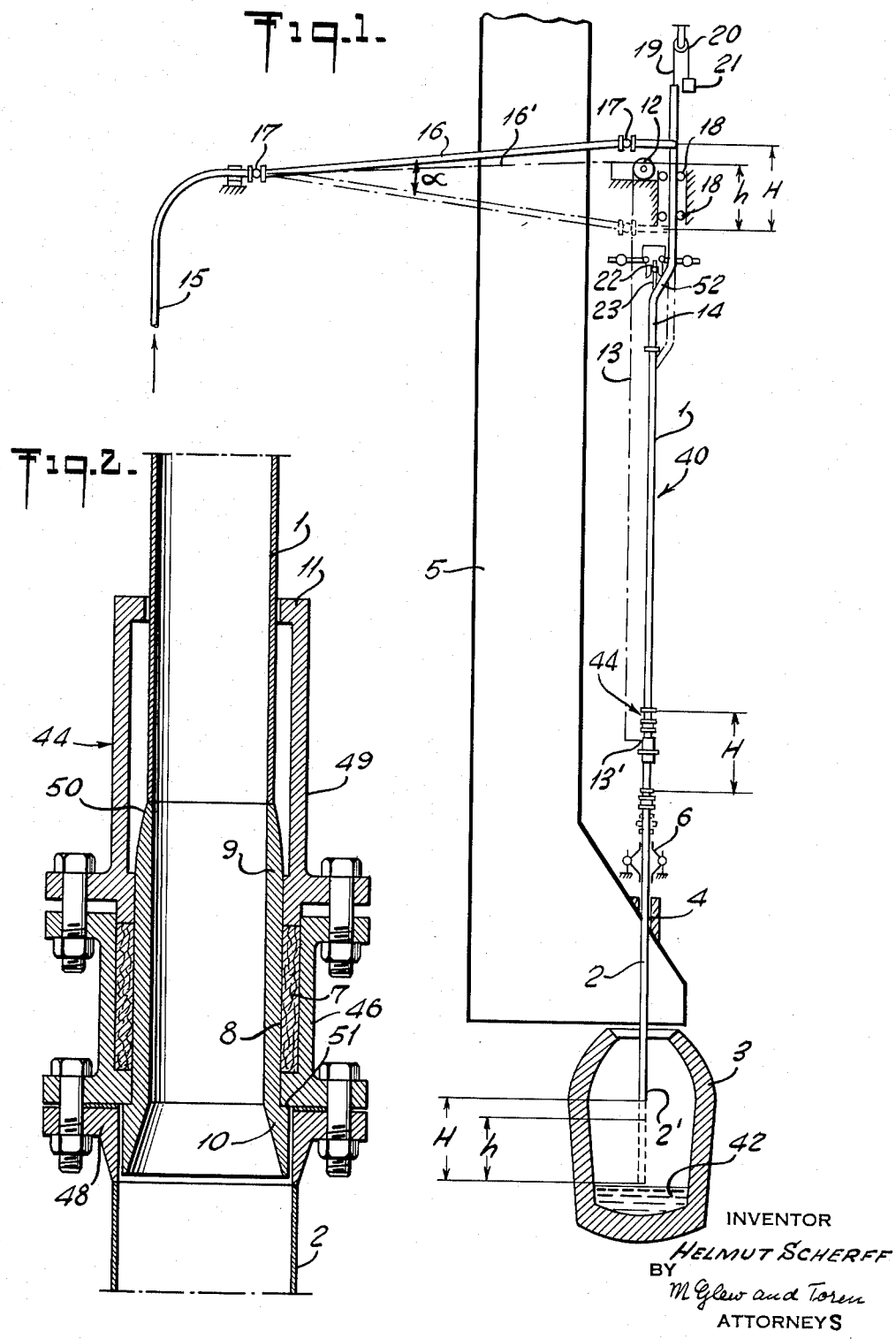

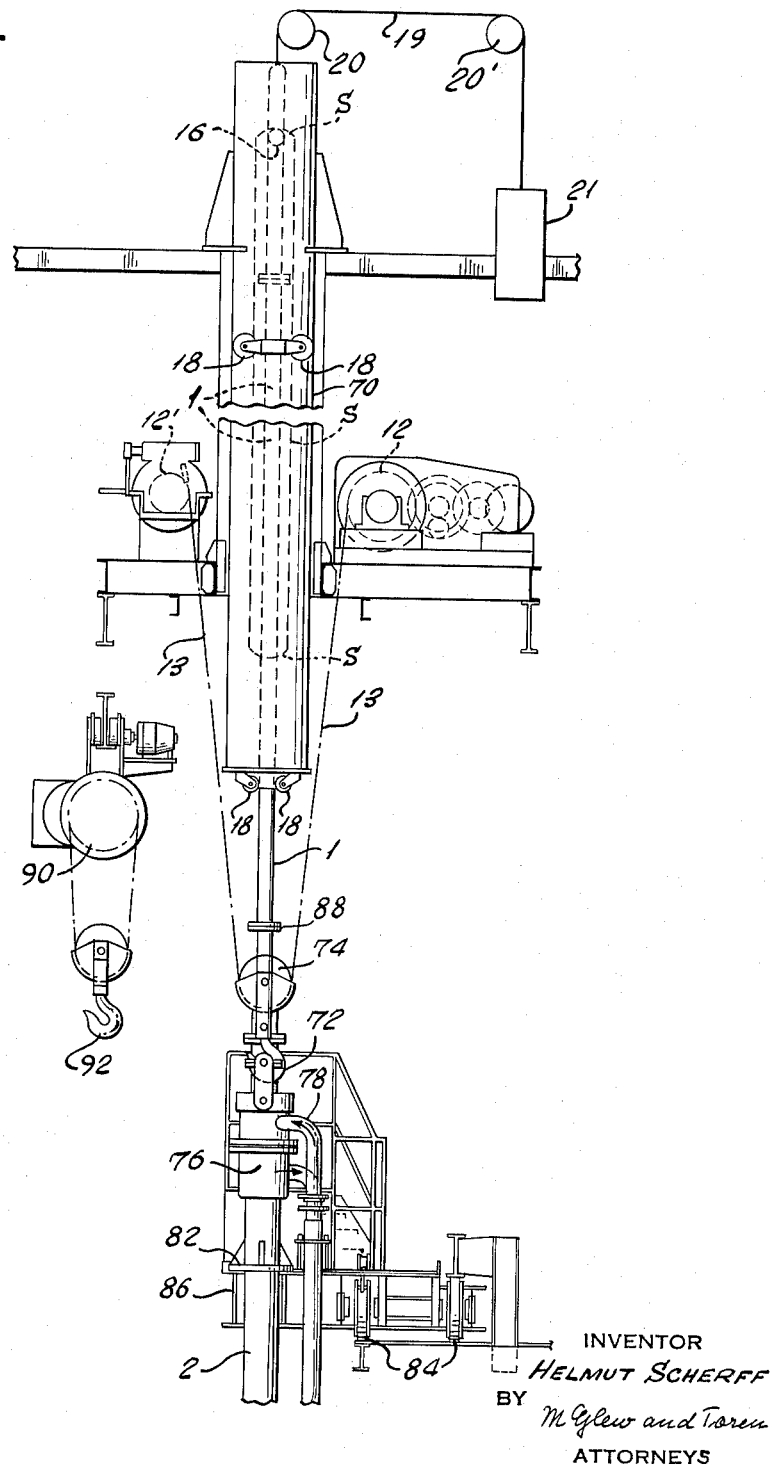

3,201,103
BLOWING TUBE APPARATUS AND METHOD FOR OPERATING IT
Helmut Scherff, Oberhausen-Sterkrade, Germany, assignor to Gutehoffnungshütte Sterkrade Aktiengesellschaft, Oberhausen, Rhineland, Germany
Filed Sept. 15, 1961, Ser. No. 138,329
Claims priority, application Germany, Sept. 24, 1960, G 30,570
19 Claims. (Cl. 266—34)

This invention relates in general to metallurgical furnace blowing tube apparatus and ot a method of operating the same and in particular to a new and useful blowing tube construction which includes telescopic sections and means to telescope one section within the other only when blowing is not occurring and to effect a tight sealing between the sections when blowing is occurring, and further to a method of operating the blowing device during a blowing cycle.

In the operation of metallurgical furnaces, it is known to employ blowing lances or tubes for blowing oxygen or air into the furnaces or converters. The tubes must be moved into the furnaces to effect the blowing operation and also moved within the furnace during the blowing operation. After the blowing operation is completed, the tubes must be removed in order to permit the metallurgical materials to be removed.

It is advantageous during the blowing process to move the end of the blowing tube relative to the metallurgical material bath in dependence on the progress of the particular metallurgical process. In a sixty ton converter, for example, a stroke of about 10 meters is required for introducing and withdrawing the blowing tube and a stroke of about 2½ meters is required for displacing the outlet end of the tube during the blowing process. With such large strokes, restricted space conditions usually do not permit the movement of the entire tube in a vertical direction.

Telescopic blowing tubes have been employed heretofore which operate within smaller space requirements. Such tubes include sections which are telescopically axially movable relative to each other and which are always maintained in sealing engagement. When the outlet end of the tube assembly is displaced during the blowing process, a sealing ring disposed between the tube sections slides on one of the two tube sections and is thus subjected to heavy wear which is particularly deleterious when powdered admixtures such as lime are blown in through the telescopic tube together with the oxygen or air. Under the pressure inside the blowing tube the powdered admixtures exert an extremely detrimental abrasive action on the seal and promote the wear thereof.

In accordance with the present invention, there is provided a telescopic blowing tube apparatus which includes telescopic sections which are sealed together only when blowing occurs and which include means to move the sections relatively without maintaining the seal therebetween after blowing has ceased. The inventive construction and method thus permits operation of the blowing tube with a minimum of wear on the sealing parts, the sealing engagement being maintained only during blowing. Since the detrimental wear is much greater during the blowing process than during introduction and withdrawal of the blowing tube, the invention provides a construction and method for effecting a relative movement between the tube sections only during the introduction and withdrawal, that is, before the beginning and after the end of the blowing process. The entirely extended tube is moved as a whole to displace the outlet end of the tube inside the converter during the blowing process. This does not mean that the apparatus requires a large amount of space because the stroke required during the blowing is small compared with the movement whereby the blowing tube is introduced and withdrawn.

A feature of the invention is that the tube sections and their sealing ring are maintained stationary relative to each other during the blowing process, so that a sliding friction under superatmospheric internal pressure is avoided. The seals of the tube sections are not subjected to superatmospheric internal pressure during the introduction and removal of the blowing tube. As a result, the seal is protected from excessive wear during the movement of one tube section in the other, even when powdered admixtures are fed to the converter through the blowing tube during the blowing process, and the life of such equipment is materially increased.

Accordingly, it is an object of this invention to provide an improved metallurgical blowing tube apparatus.

A further object of the invention is to provide a method of operating a metallurgical blowing tube.

A further object of the invention is to provide a metallurgical blowing tube apparatus which includes a tube having telescopic sections which are maintained in sealing engagement only when the tube sections are fully extended.

A further object of the invention is to provide a metallurgical apparatus including a blowing tube with telescopic sections and means to extend the sections and maintain them in sealing engagement during the blowing process, and to telescope these sections for retraction purposes and to break the seal at other times.

A further object of the invention is to provide a method of operating a telescopic blowing tube associated with a metallurgical furnace by moving the telescopic sections of the tube relative to each other to introduce the tube into and withdraw it from the furnace and to move the entire tube including all the sections relative to the furnace while the blowing is carried out.

A further object of the invention is to provide a method of operating a telescopic blowing tube associated with a metallurgical furnace which comprises extending the telescopic sections and effecting a seal therebetween only when blowing is carried out.

A further object of the invention is to provide a metallurgical furnace blowing tube apparatus which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a diagrammatic elevation, partly in section, of a metallurgical furnace having a blowing tube apparatus constructed in accordance with the invention; and FIG. 2 is a transverse section on an enlarged scale of the sealing portion of the telescopic tube sections shown in a fully extended position.

FIG. 3 is a partial elevation of a plant installation of a blowing tube constructed in accordance with the invention.

Referring to the drawings in particular, the invention embodied therein includes a blowing tube apparatus generally designated 40 which includes upper and lower telescopic sections 1 and 2 which are suspended for both telescopic and combined movement over a metallurgical furnace 3 having a metal or reaction bath 42. In the embodiment illustrated, the lowest tube section 2 extends through a guide channel or duct 4 formed at the lower end of a converter chimney 5. The guide channel 4 and the retaining device 6 hold the lower section 2 against lateral movement during the axial manipulation thereof.

During the blowing operation, the complete blowing tube assembly 40 is moved by a stroke $h$ to vary the distance between the end of the tube 2' from the top of the metal bath 42. The stroke $h$ of the outlet end 2' of the tube is much smaller than the length of the two tube sections 1 and 2 and consequently, is much smaller than the stroke of the movement whereby the lower tube section 2 is introduced and removed from the furnace 3.

In accordance with the invention, tube sections 1 and 2 are maintained fully extended and in sealing engagement during the blowing operation. When the blowing process has been terminated, the supply of oxygen or air to the blowing tube is shut off and the lower tube section 2 subsequently moves upwardly and telescopes on the upper section 1. When the converter or furnace 3 has been emptied and a new charge has been placed therein, the supply of oxygen or air will not be released until the lower tube section 2 has been reintroduced into the converter to a distance at least to the solid line location indicated in FIG. 1.

In the embodiment shown, the sealing is maintained between the sections during the blowing process by a novel sealing construction which is indicated in detail in FIG. 2. The overall connection seal is provided at a location generally designated 44 on FIGS. 1 and 2. The inner or upper tube 1 is advantageously provided with a larger diameter lower portion or section 9 which is compressed against a sealing ring 7 held within a flange section 46 which is bolted to a flange 48 of the lower section 2. A complementary sleeve member 49 is bolted to the flange section 46 and it includes an inturned end or guide ring 11 which functions to aid in maintaining the parts in axial alignment.

In FIG. 2, the sections 1 and 2 are indicated fully extended and the sealing ring 7 has been directed up over a beveled intermediate portion 50 into tight sealing engagement with an outer surface 8 of the widened diameter portion 9. The extreme lower end of the section 1 is provided with a flanged or larger diameter portion or guide ring 10 which, together with the guide ring 11, contributes to the axial stability of the two telescopic sections. The ring 10 also forms a ledge support 51 for the flange section 46.

The sealing ring 7 is not moved into engagement with the large diameter sealing surface 8 until the lower section 2 is fully retracted outwardly in respect to the inner section 1. In accordance with the invention, means are provided to lift the outer section first after the blowing process has ceased to cause the sealing ring to ride off the sealing surface 8 so that the seal will not be subjected to movable frictional engagement during the telescopic retraction of the two sections.

The blowing apparatus 40 includes means for moving the outer section 2 over the inner section 1 and for lifting the entire blowing tube by the stroke H. This means includes a winch diagrammatically indicated at 12 which advantageously may be both independently motor and hand operated. The winch 12 raises and lowers a cable or rope 13 which is connected at 13' to the upper end of the section 2 in the vicinity of the flange 48, for example.

The winch 12 operates during the upward movement of the cable 13 and during the blowing process to raise the complete blowing tube assembly including upper section 1 and lower section 2 as well as a conecting pipe 14 by a distance $h$ during the blowing operation, whereupon a ratchet projection 23 on a bend or an obstruction 52 of the connecting pipe 14, contacts a ratchet or retaining device 22 to initiate severance of the sealing ring 7 from the sealing surface 8. Complete severance of the sealing ring 7, i.e. movement off section 9, is accomplished by the time the lower end 2' moves through the distance H. Thereafter, the section 2 is telescoped over the section 1 upon further upward movement of the cable 13.

In order to facilitate the upward movement of the combined blowing apparatus 40, the connecting pipe tube is guided by means of vertically spaced guide rollers 18 and the upper end of the pipe is supported at the end of a rope 19 which extends around a roller 20 to a counterweight 21. The counterweight 21 compensates the weights of the upper tube section 1, the connection tube 14 and a pivotable supply tube 16 which is connected at each end through socket joint 17 to the connecting pipe 14 on the one hand and to a feed pipe 15 on the other hand. The feed pipe is held stationary and a pivotal tube or pipe 16 is adapted to move through an angle $\alpha$ which is usually maintained less than 20° in order to achieve the maximum overall blow pipe movement H.

In some instances one or both of the socket joints 17 include a valve which rotates to closed position when the pipe 16 is moved from the position 16' to the position 16.

The counterweight 21 insures that the loading of the winch 12 will be restricted to the weight of the lower tube section 2. The length of the pivoted tube or pipe 16 and its angle of deflection $\alpha$ are selected in accordance with the stroke H. In the particular embodiment indicated, this angle of deflection $\alpha$ is smaller than 20° and the length of the pivoted pipe will be determined in accordance therewith.

The retaining device 22 functions to take up the axial thrust supplied by the sealing ring 7 as it slides off the sealing surface 8. The same axial thrust occurs in the opposite direction when the lower tube section 2 is again lowered by lowering the cable 13 via the winch 12. During lowering, the sealing ring 7 slides back on the sealing surface 8 shortly before the fully extended position indicatied in FIG. 2 is reached. The retaining device 22 consists suitably of a ratchet mechanism which is engaged by a ball-like head of the extension 23 carried by the connecting pipe 14. The forces of the ratchet mechanism are determined to hold the tube section 1 against displacement until the extension of the lower tube section 2 causes the weight thereof to be transmitted by means of the guide and stop ring 10 to the upper tube section 1.

When the lower tube section is moved out of the converter or furnace 3 and the chimney 5, the pivoted pipe 16 will follow (at the beginning of this movement after the stroke $h$ has been completed) from its position 16' indicated with a dot-and-dash- line to its upper full line position. That end of the pivoted tube 16 which is connected to the connecting pipe 14 is thus lifted by the distance H–$h$ and the upper tube section 1 is blocked in the retaining device 22. Only thereafter is the lower tube section 2 telescoped over the upper section 1.

Depending on the nature of the seal 7, the retaining device 22 may advantageously be a stop which contacts a projecting portion of the connecting pipe 14 of the upper section 1 after an upward movement by an amount of the stroke H is carried out. In such event, the counterweight is advantageously increased by an amount sufficient to take up the upwardly directed axial thrust exerted by the sealing ring 7 as it slides up on the sealing surface 8.

It should be appreciated that the sealing ring 7 may advantageously be secured to the inner tube section 1 and the upper end of the outer tube section 2 formed like the sealing extension 9. In such as case, the outside diameter of the sealing ring would be smaller than the inside diameter of the outer tube section 2, the upper end of which carries a sealing seat with a sealing shell which conforms to the outside diameter of the sealing ring and which is received in the sealing ring after stress at the end of the extending movement.

In accordance with the principles of the invention, it is essential that the sealing ring function to secure together in sealing engagement the two sections only when the blowing tube is fully extended and to move out of sealing engagement when the blowing operation and blowing stroke have been completed. Thus, it is possible to employ a sealing ring which is resiliently inflatable under superatmospheric internal pressure, similar to a pneumatic tire. In such an instance, the seal is inflated by internal pressure to engage and apply pressure on both sides, that is, on the inner and outer tube sections, when the blowing process takes place. When the blowing process has been completed and it is desired to push the tube sections together, the internal pressure of the seal is removed to interrupt the sealing engagement.

In some instances, it is preferable to arrange the feed pipe 15 with the pivoted pipe 16 in a plane having any desired inclination relative to the drawing plane indicated in FIG. 1 and to arrange them on the same side of the converter chimney as the blowing tube 1, 2. In some instances, the blowing lance or tube 40 is arranged horizontally, depending on the nature of the operation and the furnace.

Referring to FIG. 3 there is indicated an actual plant arrangement for the various blowing tube mechanisms. In this drawing parts which are comparable to schematic indications, indicated in FIGS. 1 and 2, are similarly designated. The upper lance portion or upper section 1 projects into a guide shaft 70 which is stationarily arranged. The guide rollers 18 which are schematically shown in FIG. 1 are disposed along the length of the guide shaft 70 and bear against the upper portion of the upper section 1. The upper section, sometimes called a knee piece, is connected to the pipe 16 in the same manner as indicated in FIG. 1. The supporting cable 19 is secured to the upper end of the upper section 1 and is guided over two rollers, 20 and 20' and secured at its other and to the counterweight 21.

At the location 13' as indicated in FIG. 1 the upper end of the lower section 2 is supported by a hook 72 of a pulley block 74. The supporting cable 13 extends around the pulley block 74 and is secured at one end to a motor-driven winding drum 12 and at its opposite end is wound around a hand-operated winding device 12'. For the purposes of providing a symmetrical suspension a second roller 74 with a hook 72 (not shown) is provided on the opposite side of the blowing lance. For the normal blowing operation, that is the lifting and lowering of both sections of the lance 1 and 2, there is provided the winding drum 12 which is driven by means of a motor. The auxiliary winding device 12' makes it possible to provide an auxiliary manual drive in case the motor-winding device 12 should not operate.

In the plant installation indicated in FIG. 3 the flange portion which compares to the location 44 of FIG. 1 are indicated at the level of the crane hook 72. Between the flange path there is provided the sealing arrangement indicated in detail in FIG. 2.

Below the crane hook 72 there is indicated in FIG. 3 casing 76 surrounding the lower lance portion 2 for the connection of a cooling water supply 78 and a discharge 80.

A supporting flange 82 of the section 2 permits lowering of the blowing tube onto a supporting carriage 84 which advantageously is wheeled to permit transportation of the blowing lance in a position at the end of a projecting arm or collar 86 of the carriage 84. In order to facilitate changing of the blowing lance there are provide disconnecting or separating flanges 88 which are released for the exchange of the lance portion 2. After insertion of the new lance portions 88 are reconnected. Thus the sealing section 44 between the lance portions 1 and 2, as indicated in detail in FIG. 2, is also exchanged. The carriage 89 advantageously runs on a track which permits the carrying away of the lance section 2. In addition, a trolley hoist 90 having a crane hook 92 is provided for maneuvering the various lance sections for assembly and repair purposes.

What is claimed is:

1. A blowing tube apparatus for a metallurgical furnace and the like comprising, a first tube section, a second tube section freely telescopically movable between fully retracted and fully extended positions in cooperable engagement with said first tube section, said tube sections defining an internal blow passage therethrough, and sealing means carried by said first and second tube sections sealing the connection between said sections only when said sections are in a substantially fully extended orientation, including a formation on one of said sections which is wedged into sealing engagement with the other of said sections when said sections are moved relatively into a fully extended orientation, said sealing means being ineffective when said sections are moved from a fully extended orientation toward a retracted orientation.

2. A blowing tube apparatus for a metallurgical furnace and the like comprising a first tube section, a second tube section freely telescopically movable between fully retracted and fully extended positions in cooperable engagement with said first tube section, said tube sections defining an internal blow passage therethrough, and sealing means carried by said first and second tube sections sealing the connection between said sections only when said sections are in a substantially fully extended orientation, said sealing means being ineffective when said sections are moved from a fully extended orientation toward a retracted orientation, and said sealing means including a portion formed on one of said first and second tube sections projecting toward the other of said tube sections and a sealing ring carried by the other of said tube sections and movable over said projecting portion when the sections are in a fully extended orientation.

3. A blowing tube apparatus for a metallurgical furnace and the like comprising a first tube section, a second tube section freely telescopically movable between fully retracted and fully extended positions in cooperable engagement with said first tube section, said tube sections defining an internal blow passage therethrough, and sealing means carried by said first and second tube sections sealing the connection between said sections only when said sections are in a substantially fully extended orientation, said sealing means being ineffective when said sections are moved from a fully extended orientation toward a retracted orientation, said first section including an externally widened end portion, said second tube section having a sealing ring held at the interior thereof engageable with said widened end portion only when said second tube section is moved to a substantially fully extended position.

4. A blowing tube apparatus for a metallurgical furnace and the like comprising a first tube section, a second tube section freely telescopically movable between fully retracted and fully extended positions in cooperable engagement with said first tube section, said tube sections defining an internal blow passage therethrough, and sealing means carried by said first and second tube sections sealing the connection between said sections only when said sections are in a substantially fully extended orientation, said sealing means being ineffective when said sections are moved from a fully extended orientation toward a retracted orientation, said first tube section including a widened ring end adapted to fit within said second tube section, said second tube section having a flanged portion adapted to fit around said widened ring end to limit the amount at which said first and second tube sections may be extended by engagement of said flanged portion with said ring end in a fully extended position, and a resilient ring held in said flanged portion, said first section including an externally widened end portion engageable with said resilient ring in sealing engagement therewith when said sections are in fully extended positions, said ring being movable with said second tube section off said widened end portion when said sections are moved from an extended position toward a retracted position.

5. A blowing tube apparatus for a metallurgical furnace and the like, comprising a first tube section, a second tube section telescopically movable between fully retracted and fully extended positions in cooperable engagement with said first tube section and defining with said first tube section an internal blow passage, sealing means sealing the connection between said sections when said sections are in a substantially fully extended orientation including a formation on one of said sections which is wedged into sealing engagement with the other of said sections when said sections are moved relatively into a fully extended orientation, means to move said sections in directions into and out of the metallurgical furnace, and means to block movement of one of said tube sections and cause relative tube section movement and disengagement of said sealing means.

6. A method of operating a telescopic blowing tube having a mouth through which gases are blown and having telescoping tube sections, which blowing tube is associated with a metallurgical furnace comprising moving the telescopic sections of said tube relative to each other to introduce the mouth of said tube into and withdraw it from said furnace before and after blowing through said tube, and moving the entire tube relative to the furnace without movement of said tube sections relative to each other but with the mouth of said tube maintained within the furnace while blowing through said tube.

7. A method according to claim 6, wherein said telescopic sections are moved relatively to each other a greater amount than the entire tube is moved relative to the furnace.

8. A method according to claim 6, including introducing feed materials into said furnace through said blowing tube.

9. A method according to claim 6, including introducing gas and powdered admixtures to said blowing tube during the blowing operation.

10. A blowing tube apparatus for a metallurgical furnace comprising a blowing tube having first and second telescopic sections, one of said sections being movable between a fully retracted and a fully extended position, means carried by said first and second tube sections to seal said sections when said sections are in a fully extended position including interengaging portions on respective ones of said first and second sections which interengage when said first and second sections are oriented in a predetermined manner, means connected to the movable one of said sections to move said section along with the other section during the blowing operation while said sealing means is effectively sealing said sections together and to thereafter hold said first section and to move said movable section relative to said first section to cause said sealing means to become ineffective, said means being also effective to move said movable section to a retracted position for withdrawal from the furnace.

11. A blowing tube apparatus for a metallurgical furnace comprising a first section, means for supplying fluid to said first section, a second section telescopically engageable with said first section and forming a blow passage therewith, said first section having an externally widened end portion, said second section carrying a sealing ring engageable with said widened end portion when said sections are fully extended, means connected to said second section to move said second section, said seal being such that said sections move together, and means to block movement of said first section to cause disengagement of said sealing ring from said widened end portion and telescopic movement of said second section in respect to said first section.

12. An apparatus according to claim 11, wherein said fluid means is arranged to direct fluid to said first section and through said section only when said sections are fully extended and said sealing ring is sealing the connection therebetween.

13. A blowing tube apparatus according to claim 11, including means to hold said first section against displacement during movement of said second section relative to said first section.

14. A blowing tube apparatus according to claim 13, wherein said means is a disengageable retaining and gripping device.

15. A blowing tube apparatus according to claim 11, wherein said means to direct fluid to said first tube section includes a stationary feed pipe and a pivotal connecting pipe connected between said feed pipe and said first tube section.

16. A blowing tube apparatus for a metallurgical furnace and the like, comprising a first tube section, a second tube section telescopically movable between fully retracted and fully extended positions in cooperable engagement with and located within said first tube section and defining with said first tube section an internal blow passage, sealing means carried by said first and second tube sections including a formation on one of said sections which is wedged into sealing engagement with the other of said sections when said sections are moved relatively into a fully extended orientation sealing the connection between said sections when said sections are in a substantially fully extended orientation, means to move said sections relatively to a fully retracted telescoped orientation and to a fully extended telescopic orientation for effecting blowing therethrough, and moving means effective to move said sections together but without relative movement during blowing operation.

17. A blowing tube apparatus for a metallurgical furnace and the like, comprising a first tube section, a second tube section telescopically movable between fully retracted and fully extended positions in cooperable engagement with and located within said first tube section and defining with said first tube section an internal blow passage, sealing means carried by said first and second tube scetions including interengaging portions on respective ones of said first and second tube sections movable into interengagement for sealing the connection between said sections only when said sections are in a substantially fully extended orientation, means to move said sections relatively to a fully retracted telescopic orientation and to a fully extended telescopic orientation for effecting blowing therethrough, and moving means effective to move said sections together but without relative movement during blowing operation.

18. A blowing tube apparatus for a metallurgical furnace and the like, comprising a first tube section, a second tube section telescopically movable between fully retracted and fully extended positions in cooperable engagement with said first tube section and defining with said first tube section an internal blow passage, sealing means sealing the connection between said sections when said sections are in a substantially fully extended orientation including interengaging portions on respective ones of said first and second tube sections, moving means effective to move said sections simultaneously without relative movement during blowing operations, means to move said sections relatively, and means to block the movement of one of the sections during such relative movement and to cause disengagement of said sealing means.

19. In combination, a metallurgical furnace and a blowing tube through which a blowing fluid is directed for introduction into the furnace, said blowing tube having at least two sections which are connected together in a manner permitting one section to be telescoped within the other, means mounting said blowing tube adjacent said furnace in a manner for telescopically extending and retracting said telescopic sections of said blowing tube sufficiently to introduce said tube into and withdraw it from said furnace, and means for moving the entire tube relative to the furnace when said sections have been extended.

References Cited by the Examiner

UNITED STATES PATENTS

| | | | |
|---|---|---|---|
| 2,448,232 | 8/48 | Muse | 285—302 |
| 2,822,163 | 2/58 | McFeaters | 266—34 |
| 3,006,665 | 10/61 | Harris | 285—302 |
| 3,045,997 | 7/62 | Hudson | 266—34 |

FOREIGN PATENTS 220,279   2/25   Great Britain.

JOHN F. CAMPBELL, *Primary Examiner.*

MARCUS U. LYONS, JAMES H. TAYMAN, Jr., MORRIS O. WOLK, *Examiners.*